United States Patent
Lee et al.

(10) Patent No.: US 10,585,822 B2
(45) Date of Patent: Mar. 10, 2020

(54) OPERATION METHOD OF HOST SYSTEM INCLUDING STORAGE DEVICE AND OPERATION METHOD OF STORAGE DEVICE CONTROLLER

(71) Applicant: SAMSUNG ELECTRONICS CO., LTD., Suwon-si (KR)

(72) Inventors: Chul-Woo Lee, Suwon-si (KR); Wonhee Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/034,887

(22) Filed: Jul. 13, 2018

(65) Prior Publication Data
US 2019/0155765 A1 May 23, 2019

(30) Foreign Application Priority Data
Nov. 17, 2017 (KR) .................. 10-2017-0154289

(51) Int. Cl.
*G06F 13/16* (2006.01)
*G06F 12/02* (2006.01)
*G06F 13/42* (2006.01)

(52) U.S. Cl.
CPC ...... *G06F 13/1694* (2013.01); *G06F 12/0238* (2013.01); *G06F 13/423* (2013.01)

(58) Field of Classification Search
CPC . G06F 13/1694; G06F 12/0238; G06F 13/423
USPC ..................................................... 710/313
See application file for complete search history.

(56) References Cited

U.S. PATENT DOCUMENTS

| | | | | |
|---|---|---|---|---|
| 4,244,049 A | * | 1/1981 | York ............... | G06F 12/0864 707/999.009 |
| 5,978,902 A | * | 11/1999 | Mann .............. | G06F 11/348 712/227 |
| 7,603,500 B2 | | 10/2009 | Brahmaroutu | |
| 9,384,093 B1 | * | 7/2016 | Aiello ............. | G06F 3/0688 |
| 9,619,408 B2 | | 4/2017 | Nale et al. | |
| 10,078,113 B1 | * | 9/2018 | Usgaonkar ....... | G01R 31/31705 |
| 2007/0101081 A1 | * | 5/2007 | Kwon ............. | G06F 12/1458 711/163 |
| 2009/0043941 A1 | | 2/2009 | Brahmaroutu | |
| 2009/0089336 A1 | * | 4/2009 | Dewey ............ | G06F 11/0727 |
| 2009/0216964 A1 | * | 8/2009 | Palladino ......... | G06F 13/28 711/154 |
| 2013/0007310 A1 | * | 1/2013 | Inagaki ........... | G06F 13/28 710/26 |
| 2013/0031420 A1 | * | 1/2013 | Haverkamp ...... | G06F 11/3656 714/45 |
| 2013/0339789 A1 | * | 12/2013 | Menon ............ | G06F 11/267 714/27 |

(Continued)

OTHER PUBLICATIONS

PCI Expres Base Specification Revision 3.0 Nov. 10, 2010 (Year: 2010).*

*Primary Examiner* — Paul R. Myers
(74) *Attorney, Agent, or Firm* — Sughrue Mion, PLLC

(57) ABSTRACT

A method of operating a storage device controller which controls a storage device includes receiving a debugging data request command through a peripheral component interconnect express (PCIe) interface of the storage device controller from outside of the storage device controller, and storing debugging data in a register included in the PCIe interface.

20 Claims, 13 Drawing Sheets

(56) References Cited

U.S. PATENT DOCUMENTS

| | | | |
|---|---|---|---|
| 2013/0346802 A1* | 12/2013 | Freking | G06F 11/263 |
| | | | 714/32 |
| 2014/0006650 A1 | 1/2014 | Ramakrishnan et al. | |
| 2014/0244888 A1 | 8/2014 | Kallickal | |
| 2015/0026379 A1 | 1/2015 | Yang et al. | |
| 2015/0220354 A1 | 8/2015 | Nair | |
| 2015/0227325 A1 | 8/2015 | Rupanagunta et al. | |
| 2016/0062652 A1* | 3/2016 | Hia | G06F 12/0246 |
| | | | 711/102 |
| 2016/0210251 A1 | 7/2016 | Nale et al. | |
| 2016/0378579 A1* | 12/2016 | Zhao | G06F 11/0748 |
| | | | 714/37 |
| 2017/0132067 A1* | 5/2017 | Singaravelu Vanaja | |
| | | | G06F 11/0778 |
| 2017/0185545 A1 | 6/2017 | Kaushik et al. | |
| 2017/0242820 A1* | 8/2017 | Rupanagunta | G06F 13/4282 |

* cited by examiner

OPERATION METHOD OF HOST SYSTEM INCLUDING STORAGE DEVICE AND OPERATION METHOD OF STORAGE DEVICE CONTROLLER

CROSS-REFERENCE TO RELATED APPLICATIONS

This application claims priority under 35 U.S.C. § 119 from Korean Patent Application No. 10-2017-0154289, filed on Nov. 17, 2017, in the Korean Intellectual Property Office, the disclosure of which is incorporated by reference herein in its entirety.

BACKGROUND

Apparatuses, systems, and methods consistent with example embodiments relate to a host system including a storage device, and more particularly, an operation method of a host system for performing a debugging operation and an operation method of a storage device controller.

A flash memory device is widely used as voice and image data storage media are an important part of information devices such as a computer, a smartphone, personal digital assistant (PDA), a digital camera, a camcorder, a voice recorder, a digital music player, and a handheld PC. A representative example of a flash memory-based mass storage device is a solid-state drive (SSD). Nowadays, the SSD uses a peripheral component interconnect express (PCIe)-based nonvolatile memory express (NVMe) interface, which is capable of transferring data at a high speed to and from a host.

When a failure occurs in an NVMe interface-based SSD, debugging data may need to be obtained in order to analyze the cause of the failure. A host may obtain the debugging data through the NVMe interface, but there is difficulty in obtaining data due to various causes. For example, in the case where an error occurs in the NVMe interface or in software or firmware using the NVMe interface, the host cannot obtain debugging data through the NVMe interface.

SUMMARY

One or more example embodiments provide an operation method of a host system and an operation method of a storage device controller, capable of performing a debugging operation without using an NVMe interface.

According to an aspect of an example embodiment, a method of operating a storage device controller which controls a storage device includes receiving a debugging data request command through a peripheral component interconnect express (PCIe) interface of the storage device controller from outside of the storage device controller, and storing debugging data in a register included in the PCIe interface.

According to an aspect of an example embodiment, a method of operating a storage device controller which controls a storage device includes receiving, from a host, a debugging data request command through a peripheral component interconnect express (PCIe) interface of the storage device controller, and storing debugging data in a host buffer memory included in the host.

According to an aspect of an example embodiment, a method of operating a host a system which includes a host and a storage device may include starting, at the host, a debugging operation, stopping, at the host, an operation of a first device driver and running a second device driver, transmitting, from the host, a debugging data request command generated at the second device driver to the storage device, and transmitting, from the storage device, debugging data to the host through a peripheral component interconnect express (PCIe) interface of the storage device.

BRIEF DESCRIPTION OF THE FIGURES

The above and/or other aspects and features will become apparent by describing in detail example embodiments with reference to the accompanying drawings in which.

DETAILED DESCRIPTION

Figure 1:
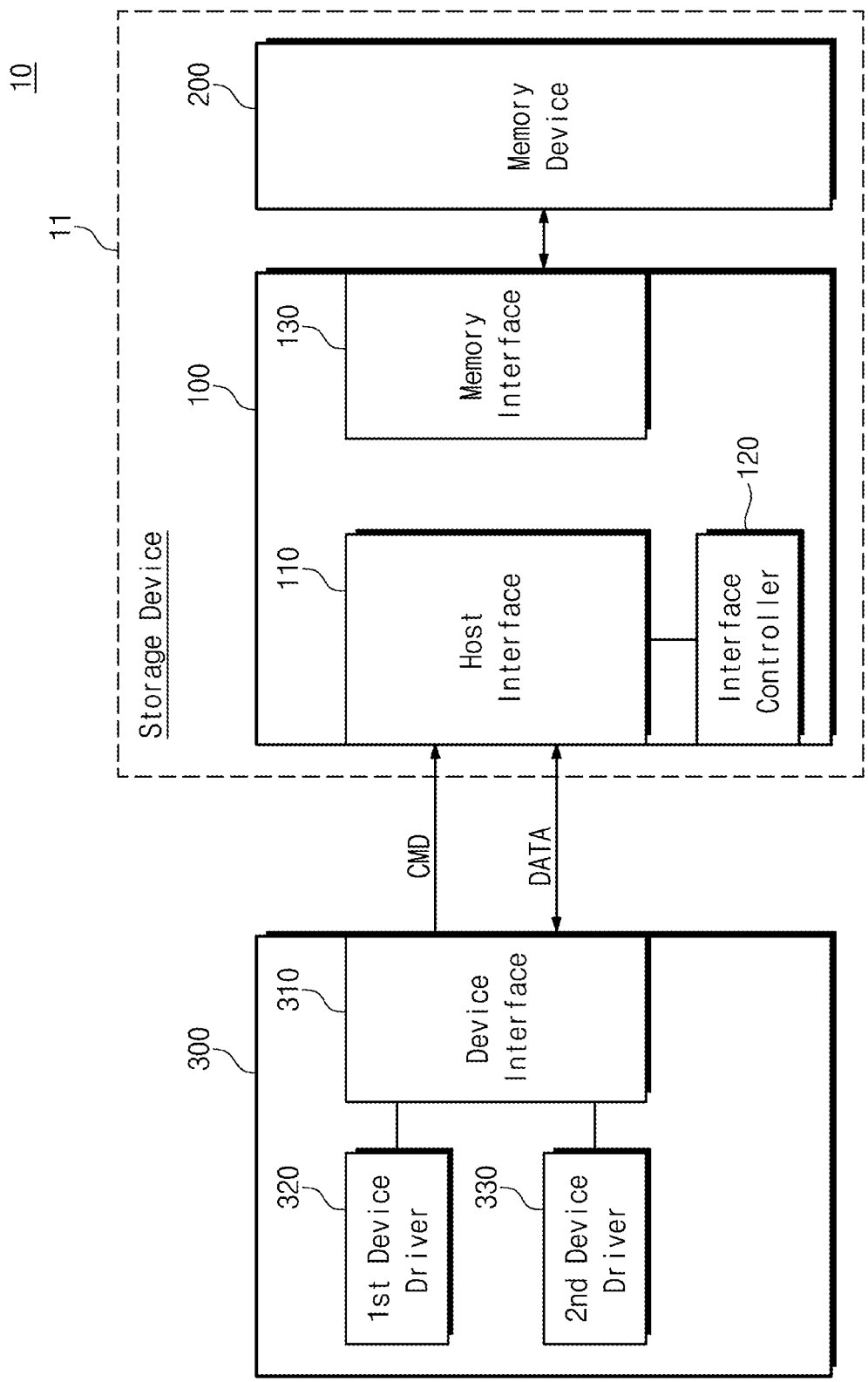
FIG. 1 is a block diagram illustrating a host system according to an example embodiment.

Below, example embodiments will be described in detail, with reference to the accompanying drawings. In the drawings, parts irrelevant to the description are omitted to clearly describe the example embodiments, and like reference numerals refer to like elements throughout the specification. In this regard, the present example embodiments may have different forms and should not be construed as being limited to the descriptions set forth herein. Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A host system according to one or more example embodiments may include a host and a Peripheral Component Interconnect Express (PCIe) device. The PCIe device may communicate with the host through an interface that complies with a PCIe standard protocol. For example, the PCIe device may include an Non-Volatile Memory Express (NVMe) device, a graphics processing unit (GPU), a network interface card (NIC), or the like. The PCIe device may be inserted into a PCIe slot and may be connected to the host system.

Below, for convenience of description, example embodiments will be described with reference to an NVMe device among PCIe devices. However, the present disclosure is not limited to the NVMe interface and may be applied to PCIe interface-based devices.

FIG. 1 is a block diagram illustrating a host system according to an example embodiment. Referring to FIG. 1, a host system 10 includes a storage device 11 and a host 300, and the storage device 11 includes a storage device controller 100 and a memory device 200. For example, the storage device 11 may be an NVMe device.

The memory device 200 may include at least one of volatile or nonvolatile memories such as a static random access memory (SRAM), a dynamic RAM (DRAM), a synchronous DRAM (SDRAM), a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. For example, in the case where the memory device 200 is a flash memory, the storage device 11 may be an NVMe SSD.

The storage device controller 100 may include a host interface 110, an interface controller 120, and a memory interface 130. The storage device controller 100 may communicate with the host 300 through the host interface 110. For example, the storage device controller 100 may communicate with the host 300 based on a protocol (hereinafter referred to as a "PCIe protocol") complying with the PCIe standard specification or a protocol (hereinafter referred to as an "NVMe protocol") complying with the NVMe standard specification.

The storage device controller 100 may receive a command CMD and data DATA from the host 300 through the host interface 110 and may transmit the data DATA to the host 300 through the host interface 110.

The interface controller 120 may manage input/output data of the host interface 110. In an example embodiment, the interface controller 120 may check the command CMD or the data DATA received to the host interface 110. In an example embodiment, the interface controller 120 may perform an operation corresponding to the received command CMD.

The interface controller 120 may be implemented in the form of hardware, software, or firmware. Alternatively, the interface controller 120 may be implemented in the form of a combination of hardware, software, or firmware.

The storage device controller 100 may communicate with the memory device 200 through the memory interface 130. In an example embodiment, the storage device controller 100 may control the memory device 200 based on the command CMD provided from the host 300. The storage device controller 100 may read data from the memory device 200 through the memory interface 130 or may store data in the memory device 200.

The host 300 may include a device interface 310, a first device driver 320, and a second device driver 330. The host 300 may transmit the command CMD and the data DATA to the storage device controller 100 through the device interface 310 and may receive the data DATA from the storage device controller 100. In an example embodiment, the device interface 310 may include a PCIe interface that operates based on the PCIe protocol. The host 300 may communicate with the storage device controller 100 through the device interface 310 depending on the PCIe protocol or the NVMe protocol.

The host 300 may use the first device driver 320 or the second device driver 330 for the purpose of communicating with the storage device controller 100. Each of the first device driver 320 and the second device driver 330 may perform communication between the host 300 and the storage device controller 100 based on a protocol complying with a given specification. In an example embodiment, the first device driver 320 may operate based on the NVMe protocol. The second device driver 330 may operate based on the PCIe protocol.

In the case where the storage device 11 is the NVMe device, the host 300 may control the storage device 11 through the first device driver 320. In the case where the storage device 11 is controlled through the first device driver 320, the storage device 11 may be recognized as an NVMe device at the host 300. Alternatively, the host 300 may control the storage device 11 through the second device driver 330. In the case where the storage device 11 is controlled through the second device driver 330, the storage device 11 may be recognized (i.e., virtualized) as a PCIe device at the host 300.

According to an example embodiment, the host 300 may control the storage device 11 through the first device driver 320. The first device driver 320 may communicate with the storage device 11 based on the NVMe protocol. In the case where a debugging operation is performed on the storage device 11 due to the failure arising from the storage device 11, the host 300 may stop an operation of the first device driver 320 and may run (e.g., execute, operate, etc.) the second device driver 330. The second device driver 330 may communicate with the storage device 11 based on the PCIe protocol.

The second device driver 330 may generate the command CMD for collecting debugging data and may transfer the generated command CMD to the storage device controller 100. The command CMD may be transferred to the storage device controller 100 through the host interface 110. The interface controller 120 may collect debugging data in response to the command CMD transferred to the host interface 110. The interface controller 120 may transfer the collected debugging data to the second device driver 330 through the host interface 110.

The second device driver 330 may use a separate scheme, which is based on the PCIe protocol, for the purpose of collecting debugging data. The separate scheme that the second device driver 330 uses to collect debugging data from the storage device controller 100 will be more fully described with reference to accompanying drawings.

Figure 2:
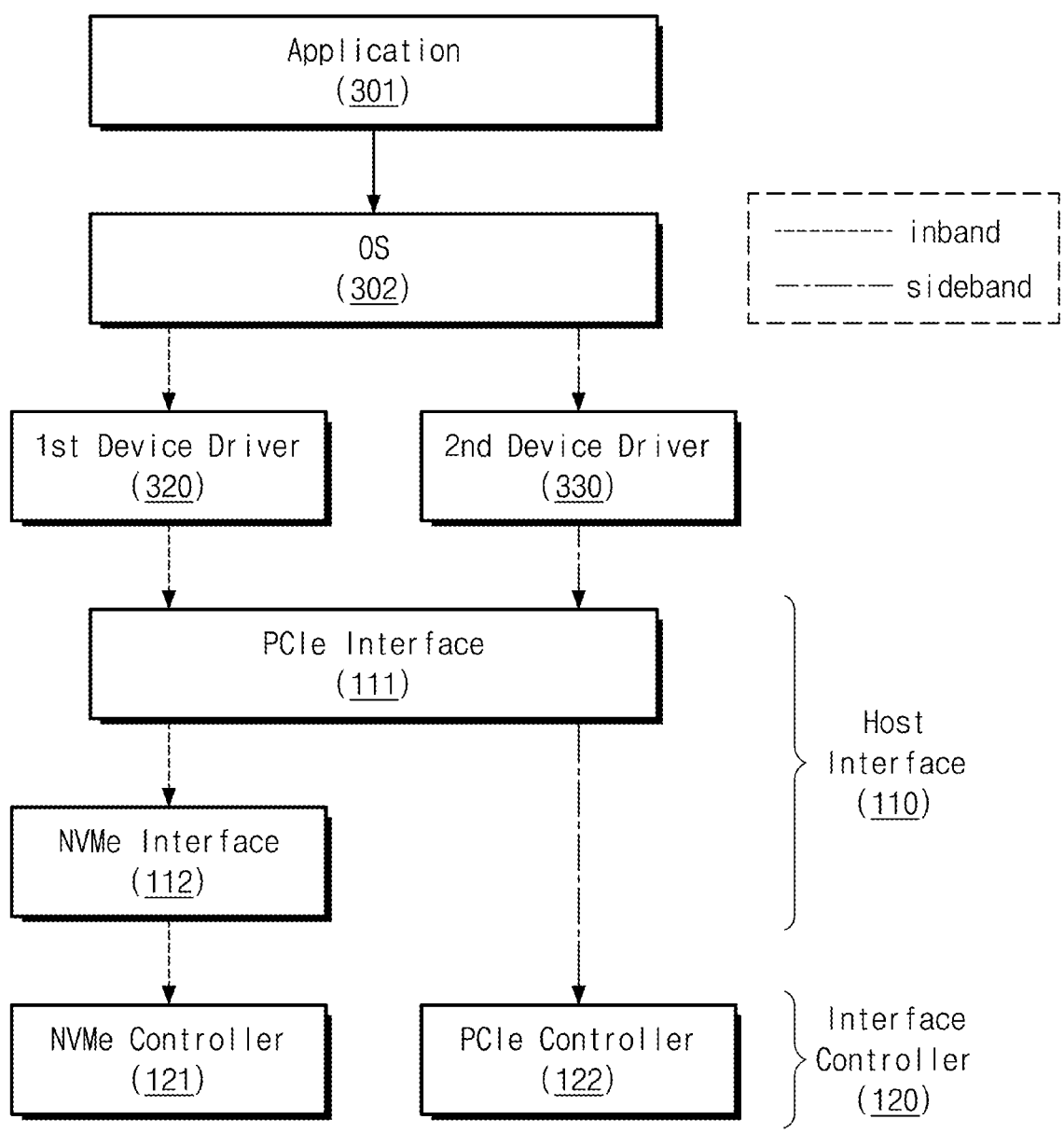
FIG. 2 is a block diagram illustrating a layer of the host system according to an example embodiment.

FIG. 2 is a block diagram illustrating a layer of a host system according to an example embodiment. Referring to FIGS. 1 and 2, a layer of the host system 10 may include an application 301, an operating system 302, the first device driver 320, the second device driver 330, a PCIe interface 111, an NVMe interface 112, an NVMe controller 121, a PCIe controller 122. The application 301, the operating system 302, the first device driver 320, and the second device driver 330 may be software included in the host 300. The PCIe interface 111 and the NVMe interface 112 may be included in the host interface 110 of the storage device controller 100. The NVMe controller 121 and the PCIe controller 122 may be included in the interface controller 120 of the storage device controller 100.

The application 301 may include various application programs that are driven on the host system 10. For example, the application 301 may include an application program that performs a debugging operation on the storage device 11. As the application 301 is executed, communication performance between the host 300 and the storage device 11 may be required.

The operating system 302 may manage a central processing unit (CPU), a memory, and a resource of the storage device 11, which constitute the host system 10. The operating system 302 may manage memory addresses of the memory and the storage device 11. For example, the operating system 302 may manage memory addresses at which debugging data associated with the storage device 11 will be stored.

As the application 301 is executed, the operating system 302 may allocate a memory address of the host 300 or memory addresses of the storage device 11. The allocated memory address may be used for an operation of the host system 10. For example, the operating system 302 may allocate a memory address at which debugging data will be stored. Debugging data collected according to a debugging operation may be stored at the allocated memory address.

The first device driver 320 may be used to control the storage device 11 based on the NVMe protocol. In an example embodiment, depending on the execution of the application 301, the first device driver 320 may collect information for generating the command CMD from the operating system 302. The first device driver 320 may generate the command CMD in compliance with the NVMe protocol, based on the collected information. The first device driver 320 may transfer the generated command CMD to the storage device controller 100 through the device interface 310.

The second device driver 330 may be used to control the storage device 11 based on the PCIe protocol. In an example embodiment, depending on the execution of the application 301, the second device driver 330 may collect information for generating the command CMD from the operating system 302. The second device driver 330 may generate the command CMD in compliance with the PCIe protocol, based on the collected information. The second device driver 330 may transfer the generated command CMD to the storage device controller 100 through the device interface 310.

The PCIe interface 111 may be a communication path for transmitting and receiving the command CMD and the data DATA depending on the PCIe protocol. The NVMe interface 112 may be a communication path for transmitting and receiving the command CMD and the data DATA depending on the NVMe protocol. The NVMe protocol may be formed based on the PCIe protocol. As such, the NVMe interface 112 may transmit and receive the command CMD and the data DATA through the PCIe interface 111.

The NVMe controller 121 may perform a management operation for the NVMe interface 112. In an example embodiment, the NVMe controller 121 may manage input/output data transmitted/received through the NVMe interface 112. For example, the NVMe controller 121 may check the command CMD or the data DATA transferred to the NVMe interface 112. The NVMe controller 121 may transfer the data DATA to the host 300 through the NVMe interface 112. In the case where the NVMe controller 121 is implemented in the form of software or firmware, the NVMe controller 121 may be stored in a memory space (e.g., a read-only memory (ROM)) in the storage device controller 100.

The PCIe controller 122 may perform a management operation for the PCIe interface 111. In an embodiment, the PCIe controller 122 may manage input/output data transmitted/received through the PCIe interface 111. For example, the PCIe controller 122 may check the command CMD or the data DATA transferred to the PCIe interface 111. The PCIe controller 122 may transfer the data DATA to the host 300 through the PCIe interface 111. In the case where the PCIe controller 122 is implemented in the form of software or firmware, the PCIe controller 122 may be stored in a memory space (e.g., ROM) in the storage device controller 100.

According to an example embodiment, the host 300 may transfer the command CMD to the storage device controller 100 through the first device driver 320. In an example embodiment, the command CMD generated in the first device driver 320 may be generated based on the NVMe protocol. In the case where the command CMD generated based on the NVMe protocol is transferred, the NVMe interface 112 may be used. The command CMD may be transferred to the NVMe interface 112 through the PCIe interface 111. The NVMe controller 121 may check the command CMD transferred through the NVMe interface 112 and may perform an operation corresponding to the command CMD.

After processing the command CMD transferred from the first device driver 320, the NVMe controller 121 may transfer the result of processing the command CMD to the first device driver 320 through the NVMe interface 112.

As such, in the case where the first device driver 320 operates, the host 300 and the storage device controller 100 may communicate with each other through an inband (or a mainband). That is, in the specification, the inband may be a communication path where the NVMe interface 112 is used, in communication between the host 300 and the storage device controller 100. In a normal operation of the host system 10, the host 300 and the storage device controller 100 may communicate with each other through the inband.

According to an example embodiment, in the case where the failure arises from the storage device 11, the host 300 may perform a debugging operation on the storage device 11. The host 300 may receive debugging data from the storage device 11 through the debugging operation and may analyze the received debugging data to check the cause of a failure of the storage device 11.

In the case of performing the debugging operation, the host 300 may stop an operation of the first device driver 320 and may run the second device driver 330. In an example embodiment, the second device driver 330 may be separate software distinguished from the first device driver 320. The host 300 may transfer the command CMD for collecting debugging data to the storage device controller 100 through the second device driver 330. The storage device controller 100 may receive the command CMD and may transfer debugging data to the second device driver 330. For example, the debugging data may include dump data or log data.

The second device driver 330 may transfer the command CMD through the PCIe interface 111. The PCIe controller 122 may check the command CMD transferred to the PCIe interface 111 and may perform an operation corresponding to the command CMD. The PCIe controller 122 may collect debugging data and may transfer the collected debugging data to the second device driver 330 through the PCIe interface 111.

The second device driver 330 may communicate with the storage device controller 100 without using the NVMe interface 112. In this case, the second device driver 330 may communicate with the storage device controller 100 based on the PCIe protocol.

As such, in the case where the second device driver 330 operates, communication may be performed through a sideband. That is, in the specification, the sideband may be a communication path where the NVMe interface 112 is not used, in communication between the host 300 and the storage device controller 100. In an example embodiment, the host 300 and the storage device controller 100 may communicate with each other by using the sideband for the purpose of performing the debugging operation.

Below, the process for a debugging operation through the sideband will be described. First, the host 300 may execute the application 301 for performing the debugging operation. As the application 301 is executed, the second device driver 330 may operate. Alternatively, as the application 301 is executed, the second device driver 330 may operate through the operating system 302.

The second device driver 330 may generate the command CMD for collecting debugging data. The second device driver 330 may obtain relevant information from the operating system 302 to generate the command CMD. The second device driver 330 may transfer the generated command CMD to the storage device controller 100 through the sideband (i.e., the PCIe interface 111).

The PCIe controller 122 may check the command CMD transferred from the second device driver 330 through the PCIe interface 111. The PCIe controller 122 may transfer the collected debugging data to the second device driver 330 through the sideband (i.e., the PCIe interface 111). The application 301 may check the cause of the failure of the storage device 11 from the transferred debugging data.

As described above, the debugging operation may be performed through the sideband. As such, even an error or malfunction occurs from hardware, software, or firmware on the inband, the debugging operation may be performed through hardware, software, or firmware on the sideband.

As illustrated in FIG. 2, the PCIe controller 122 and the NVMe controller 121 may be present in the interface controller 120 independently of each other. However, the present disclosure may not be limited thereto. For example, the PCIe controller 122 and the NVMe controller 121 need not be independent of each other. In this case, the interface controller 120 may include all functions of the PCIe controller 122 and the NVMe controller 121.

Figure 3:
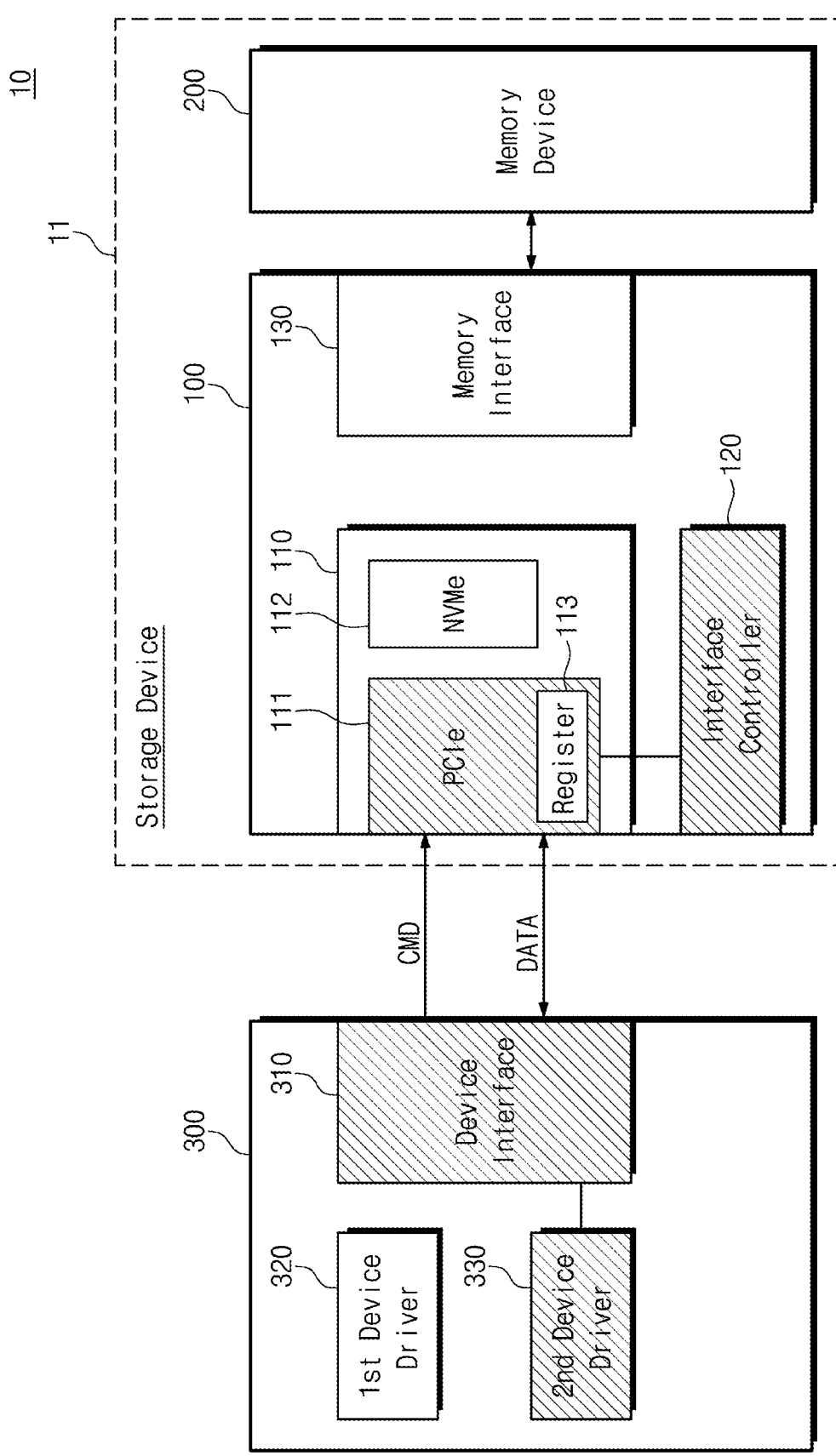
FIG. 3 is a block diagram for describing a debugging operation of the host system of FIG. 1 according to an example embodiment.

FIG. 3 is a block diagram for describing a debugging operation of a host system of FIG. 1 according to an example embodiment. Referring to FIGS. 1 to 3, the host system 10 includes the storage device 11 and the host 300, and the storage device 11 includes the storage device controller 100 and the memory device 200. The storage device controller 100 may include the host interface 110, the interface controller 120, and the memory interface 130. The host 300 may include the device interface 310, the first device driver 320, and the second device driver 330. The storage device controller 100, the memory device 200, and the host 300 are the same as the storage device controller 100, the memory device 200, and the host 300 of FIG. 1, and thus, a duplicated description thereof will not be repeated here.

The host interface 110 may include the PCIe interface 111 and the NVMe interface 112. The PCIe interface 111 and the NVMe interface 112 are the same as the PCIe interface 111 and the NVMe interface 112 of FIG. 2, and thus, a duplicated description thereof will not be repeated here.

The PCIe interface 111 may include a register 113. The second device driver 330 and the interface controller 120 may transmit and receive the command CMD through the register 113. For example, the register 113 may be included in a PCIe extended configuration register space.

To request debugging data, the second device driver 330 may store the command CMD in the register 113. The interface controller 120 may check the command CMD stored in the register 113 and may collect debugging data. The interface controller 120 may store the collected debugging data in the register 113. The second device driver 330 may receive the debugging data by reading the debugging data stored in the register 113.

According to an example embodiment, the debugging operation associated with the storage device 11 may be performed through the sideband. That is, the second device driver 330, the device interface 310, the PCIe interface 111, and the interface controller 120 may be used for the debugging operation. The host 300 may request the debugging data from the storage device controller 100 by using only the PCIe interface 111 and may receive the debugging data from the storage device controller 100.

Even when an error occurs with hardware, software, or firmware on the inband, the host 300 may perform the debugging operation by using hardware, software, or firmware on the sideband. Also, in the debugging operation through the sideband, a separate interface or device may be unnecessary. Accordingly, the host system 10 may perform the debugging operation at fast speed by using the PCIe interface 111 without changing hardware.

Figure 4:
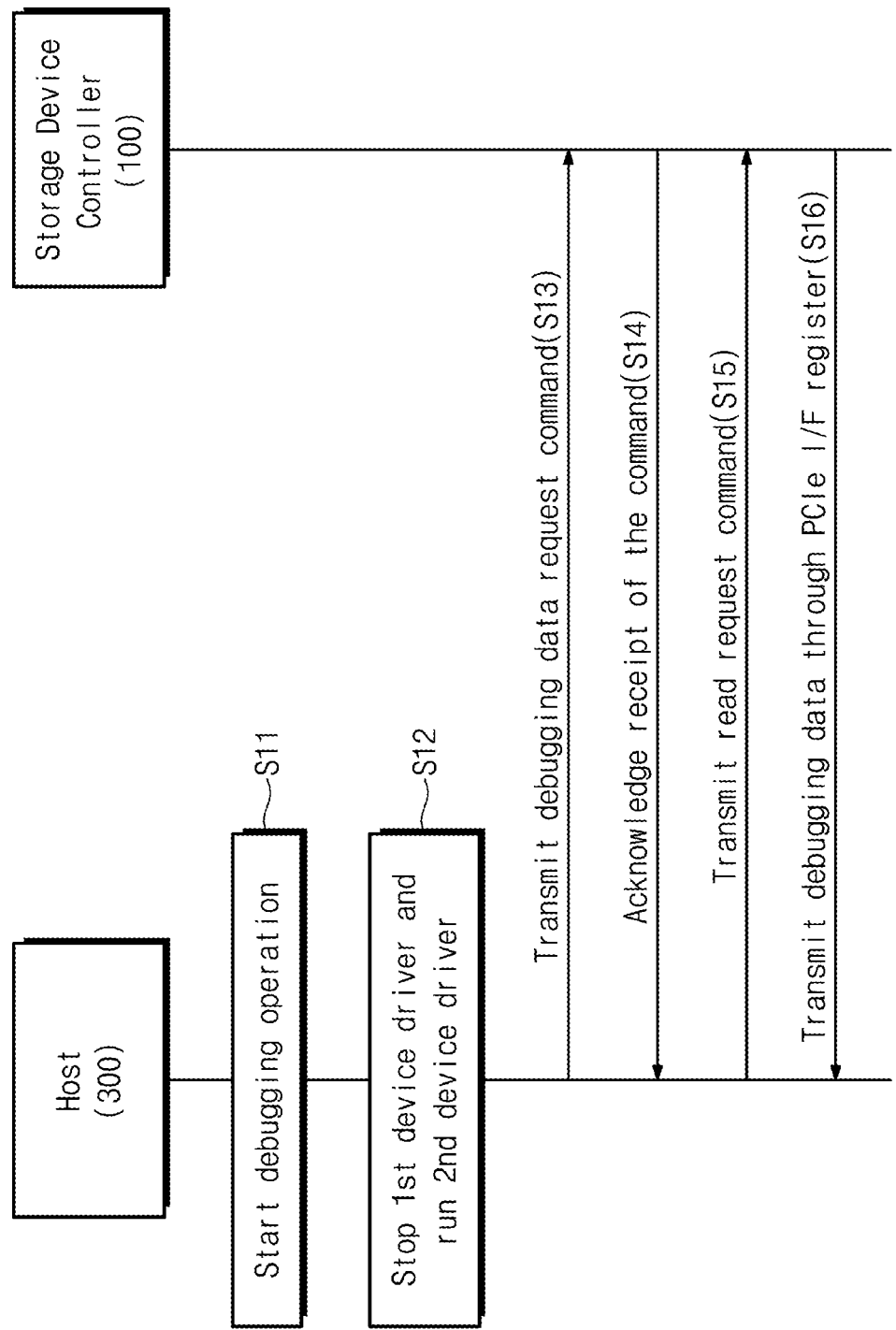
FIG. 4 is a flowchart illustrating an operation method of the host system of FIG. 3 according to an example embodiment.

FIG. 4 is a flowchart illustrating an operation method of a host system of FIG. 3 according to an example embodiment. Referring to FIGS. 3 and 4, in operation S11, the host 300 may start the debugging operation. For example, in the case where the failure arises from the storage device 11, the host 300 may start the debugging operation. Alternatively, regardless of the failure arising from the storage device 11, the host 300 may start the debugging operation.

In operation S12, to perform the debugging operation, the host 300 may stop an operation of the first device driver 320 and may run the second device driver 330.

In operation S13, the host 300 may transmit a debugging data request command CMD to the storage device controller 100. In an example embodiment, the host 300 may generate the debugging data request command CMD through the second device driver 330 and may transmit the generated command CMD to the storage device controller 100. The generated command CMD may be stored in the register 113 included in the PCIe interface 111.

In operation S14, the storage device controller 100 may acknowledge receipt of the command CMD to the host 300. In an example embodiment, the storage device controller 100 may check receipt of the command CMD by periodically checking the register 113 of the PCIe interface 111 or may check receipt of the command CMD through a polling operation by the host 300. Alternatively, the storage device controller 100 may determine that the command CMD is received, by receiving an interrupt transmitted from the host 300 and checking the register 113.

In operation S15, the host 300 may transmit a read request command CMD to the storage device controller 100. The read request command CMD may be a command that is transmitted to the storage device controller 100 before the host 300 reads the debugging data. The host 300 may store the read request command CMD in the register 113 of the PCIe interface 111.

In operation S16, the storage device controller 100 may transmit the debugging data to the host 300 through the register 113 in response to the read request command CMD.

In an example embodiment, the storage device controller 100 may transmit the debugging data to the host 300 by collecting the debugging data and storing the collected debugging data in the register 113. The storage device controller 100 may acknowledge completion of transmission to the host 300 after storing the debugging data in the register 113.

The host 300 may obtain the debugging data by reading the debugging data stored in the register 113. The host 300 may check the failure cause of the storage device 11 from the obtained debugging data.

Figure 5:
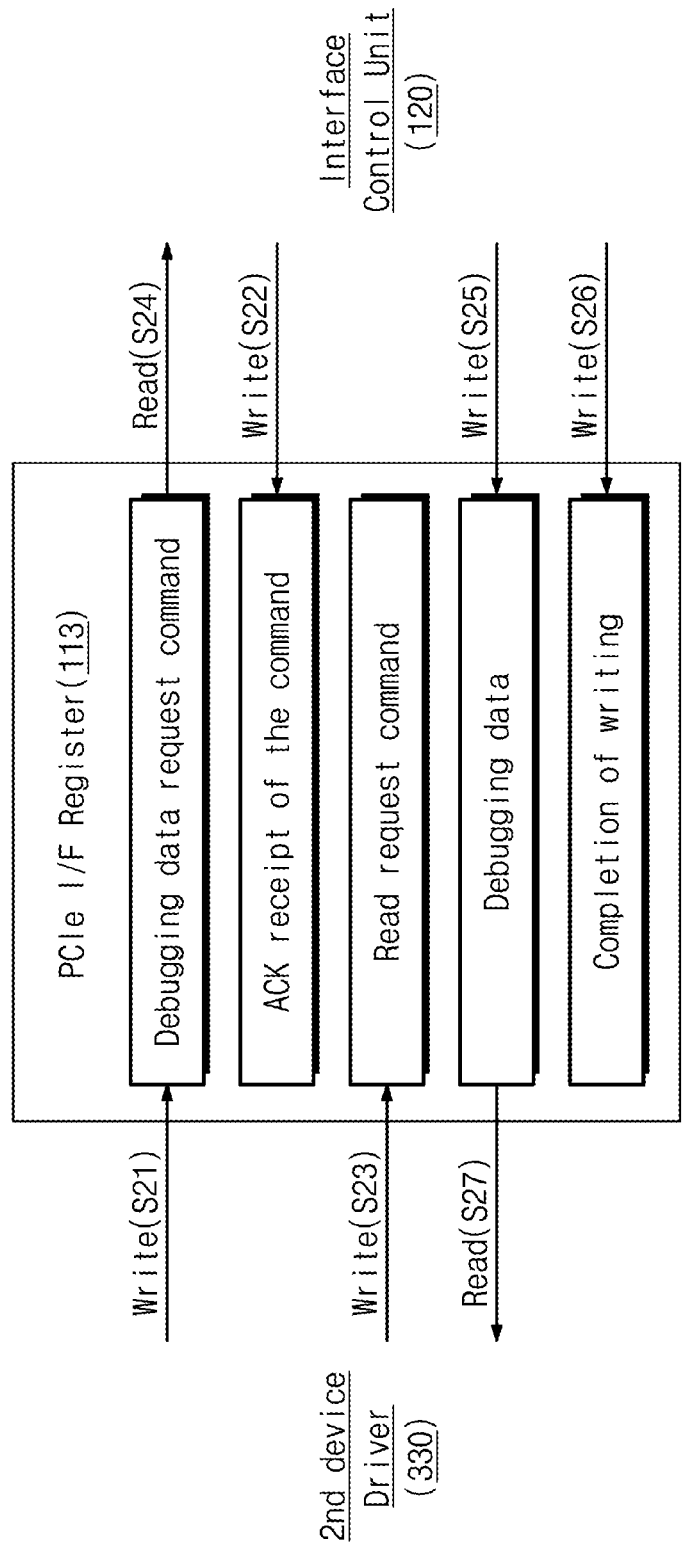
FIG. 5 is a view for describing an example of a protocol used in a debugging operation of a host system of FIG. 3.

FIG. 5 is a view for describing an example of a protocol used in a debugging operation of a host system of FIG. 3. Referring to FIGS. 2, 3, and 5, the host system 10 may transmit and receive the command CMD and the data DATA by using the register 113 of the PCIe interface 111. For example, the register 113 may be a vendor specific register in the PCIe extended configuration register space.

The host 300 may collect debugging data through the second device driver 330. The storage device controller 100 may provide the debugging data through the interface controller 120. Alternatively, the storage device controller 100 may provide the debugging data through the PCIe controller 122 included in the interface controller 120.

Below, for convenience of description, the protocol used in the debugging operation will be described with reference to the second device driver 330 and the interface controller 120 of the host system 10.

In the case where the application 301 for the debugging operation is executed, the second device driver 330 may generate the debugging data request command CMD. In operation S21, the second device driver 330 may store the debugging data request command CMD in the register 113 of the PCIe interface 111.

In operation S22, the interface controller 120 may check receipt of the debugging data request command CMD and may store a value (e.g., ACK (acknowledge character)) indicating the receipt of the command CMD in the register 113. In an embodiment, the interface controller 120 may determine that the command CMD is received, by periodically checking the register 113 or through a polling operation by the host 300. Alternatively, the interface controller 120 may check the register 113 in response to the command CMD transmitted from the second device driver 330.

In operation S23, the second device driver 330 may store the read request command CMD in the register 113. The interface controller 120 may check receipt of the read request command CMD in a method that is the same as the method of checking the receipt of the debugging data request command CMD.

In operation S24, the interface controller 120 may fetch the debugging data request command CMD in response to the read request command CMD. The interface controller 120 may interpret the fetched debugging data request command CMD to check an operation that the command CMD requires. In operation S25, the interface controller 120 may store debugging data in the register 113 depending on the debugging data request command CMD.

After storing the debugging data in the register 113, in operation S26, the interface controller 120 may store a value (e.g., a completion message) indicating completion of writing the debugging data in the register 113. After checking the completion of writing the debugging data, in operation S27, the second device driver 330 may read the debugging data stored in the register 113.

Through operation S21 to operation S27, the host 300 may request the debugging data from the storage device controller 100 by using the register 113, and the storage device controller 100 may transfer the debugging data to the host 300 by using the register 113.

As illustrated in FIG. 5, the interface controller 120 may provide the debugging data based on one read request command CMD. However, the event that the interface controller 120 does not store the debugging data in the register 113 included in the PCIe interface 111 once may occur. In this case, the interface controller 120 may provide the debugging data based on a plurality of read request commands CMD. For example, in the case where a memory capacity of the register 113 is limited, the debugging data may be divided and stored in the register 113. In this case, operation S23 to operation S27 may be repeatedly performed.

As described above, the host system 10 according to an example embodiment may collect the debugging data by using the register 113 that pre-exists in the PCIe interface 111. Accordingly, the host system 10 may collect the debugging data through the sideband without changing existing hardware.

Figure 6:
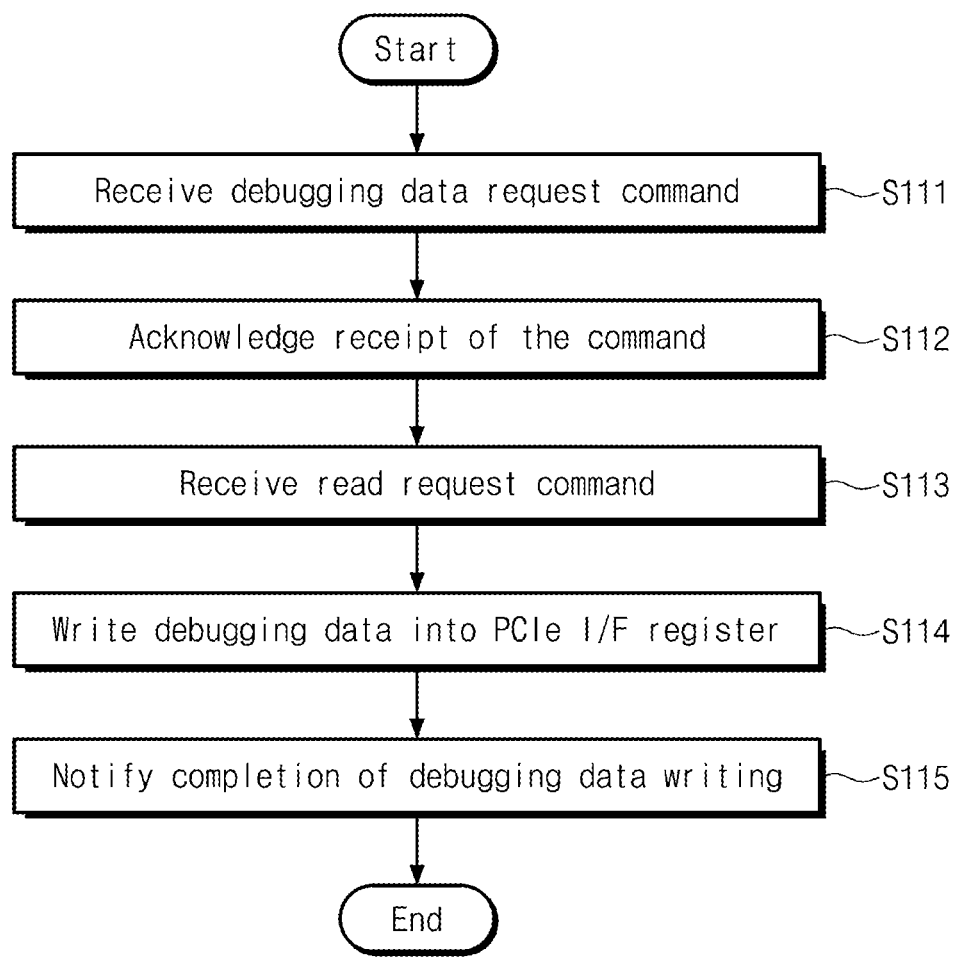
FIG. 6 is a flowchart illustrating an operation method of a storage device controller of FIG. 3 according to an example embodiment.

FIG. 6 is a flowchart illustrating an operation method of a storage device controller of FIG. 3 according to an example embodiment. Referring to FIGS. 3 and 6, in operation S111, the storage device controller 100 may receive the debugging data request command CMD from the host 300. In operation S112, the storage device controller 100 may acknowledge receipt of the command CMD to the host 300. In operation S113, the storage device controller 100 may receive the read request command CMD from the host 300. In operation S114, the storage device controller 100 may store the debugging data in the register 113 included in the PCIe interface 111 in response to the read request command CMD. In operation S115, the storage device controller 100 may notify the host 300 that the debugging data are completely written.

Figure 7:
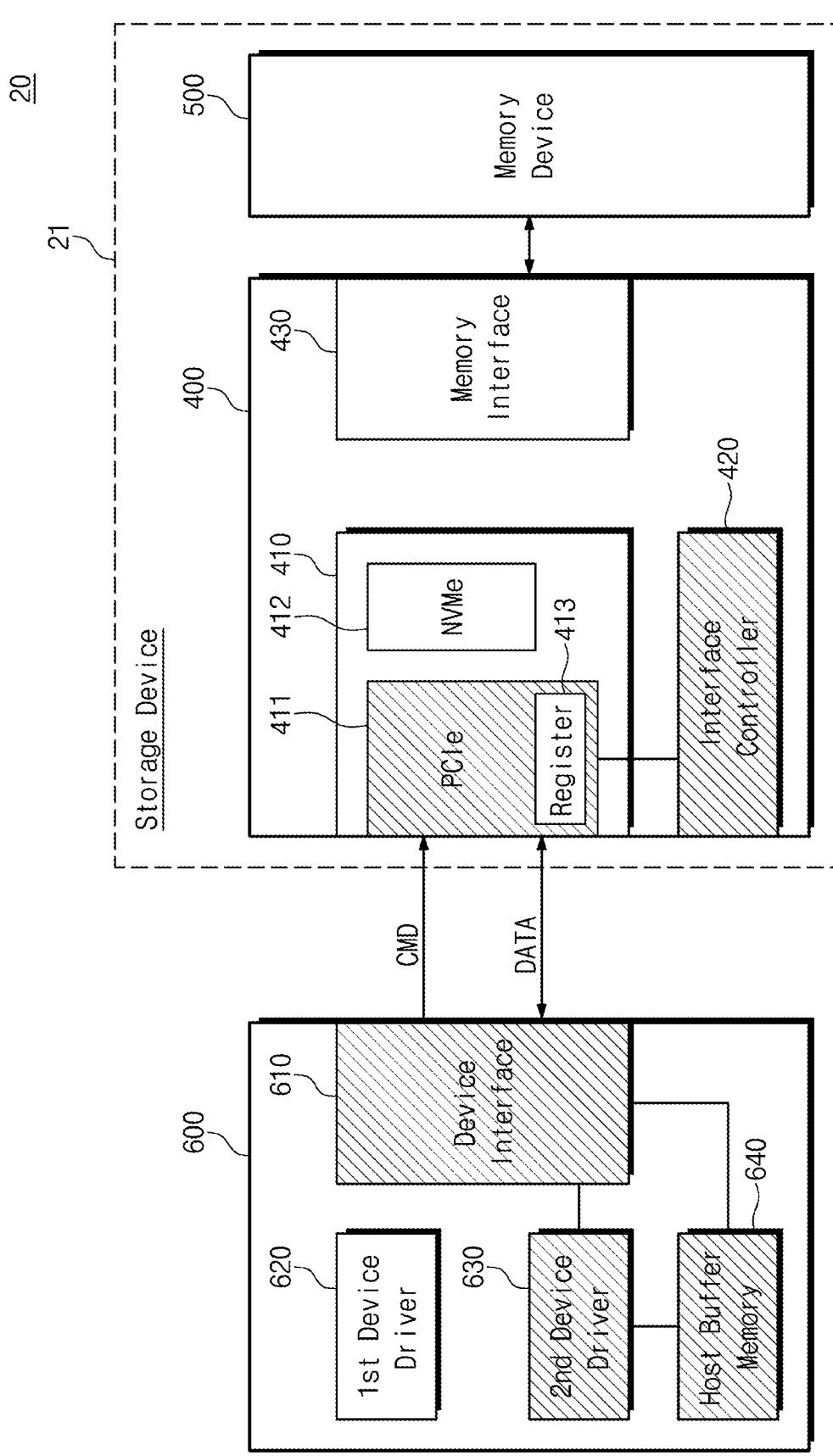
FIG. 7 is a block diagram for describing a debugging operation of the host system of FIG. 1 according to an example embodiment.

FIG. 7 is a block diagram for describing a debugging operation of a host system of FIG. 1 according to an example embodiment. Referring to FIG. 7, a host system 20 may include a storage device 21 and a host 600. The storage device 21 may include a storage device controller 400 and a memory device 500. Operations of the storage device controller 400 and the host 600 are the same as the operations of the storage device controller 100 and the host 300 of FIGS. 1 and 3, and thus, a duplicated description thereof will not be repeated here.

The host 600 may include a device interface 610, a first device driver 620, a second device driver 630, and a host buffer memory 640. Operations of the device interface 610, the first device driver 620, and the second device driver 630 are the same as the operations of the device interface 310, the first device driver 320, and the second device driver 330 of FIGS. 1 and 3, and thus, a detailed description thereof will not be repeated here.

The host buffer memory 640 may be a memory area, which the storage device controller 400 is able to independently use, of a memory included in the host 600. Accordingly, the storage device controller 400 may directly access the host buffer memory 640 and may store the data DATA in the host buffer memory 640. In an example embodiment, the storage device controller 400 may store the data DATA in the host buffer memory 640 through the device interface 610.

The second device driver 630 may manage input/output data of the host buffer memory 640. For example, the second device driver 630 may fetch the data DATA stored in the host buffer memory 640 and may transfer the fetched data DATA to an application or a separate memory area.

The storage device controller 400 may include a PCIe interface 411, an NVMe interface 412, and an interface controller 420. Operations of the PCIe interface 411, the NVMe interface 412, and the interface controller 420 are the same as the operations of the PCIe interface 111, the NVMe interface 112, and the interface controller 120 of FIG. 3, and thus, a detailed description thereof will not be repeated here.

The interface controller 420 may transfer the data DATA to the host 600 through the PCIe interface 411. The interface controller 420 may transfer the data DATA to the host 600 by storing the data DATA in a register 413. Alternatively, the interface controller 420 may transfer the data DATA to the host 600 by storing the data DATA in the host buffer memory 640.

According to an example embodiment, the host 600 may transfer the command CMD to the storage device controller 400 through the second device driver 630. The second device driver 630 may request the storage device controller 400 to directly store the debugging data in the host buffer memory 640. In this case, the command CMD may include address information of the host buffer memory 640. In an embodiment, the second device driver 630 may transfer the command CMD to the storage device controller 400 by storing the command CMD in the register 413.

The interface controller 420 may check the command CMD received from the host 600 and may transfer the debugging data to the host 600. In an embodiment, the interface controller 420 may check the command CMD stored in the register 413 and may store the debugging data in the host buffer memory 640 in response to the command CMD. The interface controller 420 may store the debugging data at an address of the host buffer memory 640 included in the command CMD.

According to the above description, the host 600 may check the failure cause of the storage device 21 from the debugging data stored in the host buffer memory 640.

According to the host system 20 of FIG. 7, the host 600 may obtain the debugging data through the sideband. That is, the second device driver 630, the device interface 610, the PCIe interface 411, and the interface controller 420 may be used for the debugging operation. The host 600 may request the debugging data from the storage device controller 400 by using only the PCIe interface 411 and may receive the debugging data from the storage device controller 400.

The host 600 may obtain the debugging data by using the register 413 pre-existing in the PCIe interface 111 and the host buffer memory 640 pre-existing in the host 600. Accordingly, the host system 20 may collect the debugging data associated with the storage device 21 without adding separate hardware.

In general, a capacity of the host buffer memory 640 may be greater than that of the register 413. Accordingly, in the case where the storage device controller 400 directly stores the debugging data in the host buffer memory 640, the debugging data may be stored once (e.g., burst write).

Figure 8:
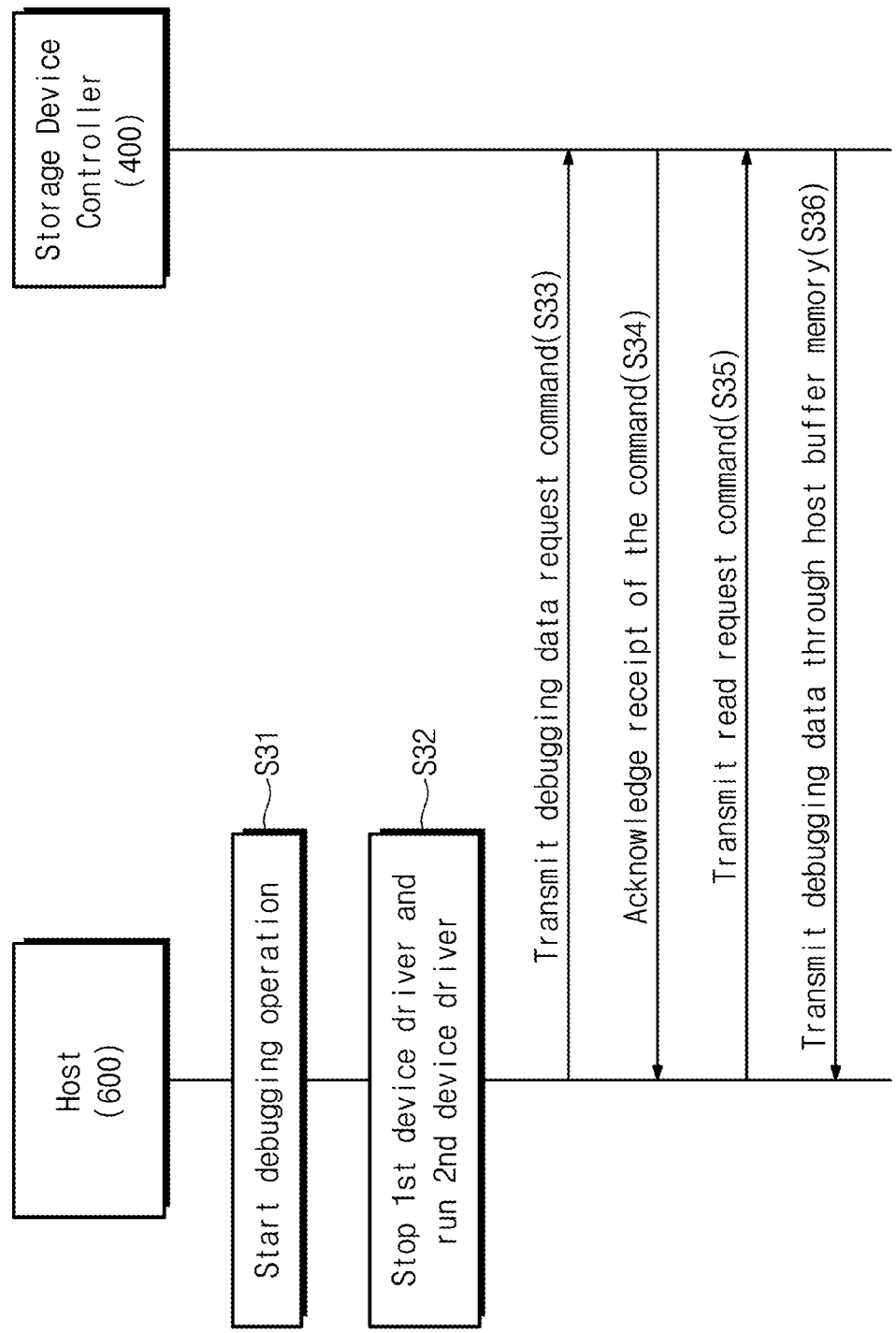
FIG. 8 is a flowchart illustrating an operation method of the host system of FIG. 7 according to an example embodiment.

FIG. 8 is a flowchart illustrating an operation method of a host system of FIG. 7 according to an example embodiment. Referring to FIGS. 7 and 8, the host 600 and the storage device controller 400 may perform operation S31 and operation S35. Operations S31, S32, S33, S34, and S35 are the same as operations S11, S12, S13, S14, and S15 of FIG. 4, and thus, a detailed description thereof will not be repeated here.

In operation S35, the storage device controller 400 may receive the read request command CMD. In operation S36, the storage device controller 400 may transmit the debugging data to the host 600 in response to the read request command CMD. In an example embodiment, the storage device controller 400 may transmit the debugging data to the host 600 by storing the debugging data in the host buffer memory 640. After storing the debugging data in the host buffer memory 640, the storage device controller 400 may acknowledge completion of transmission to the host 600.

Figure 9:
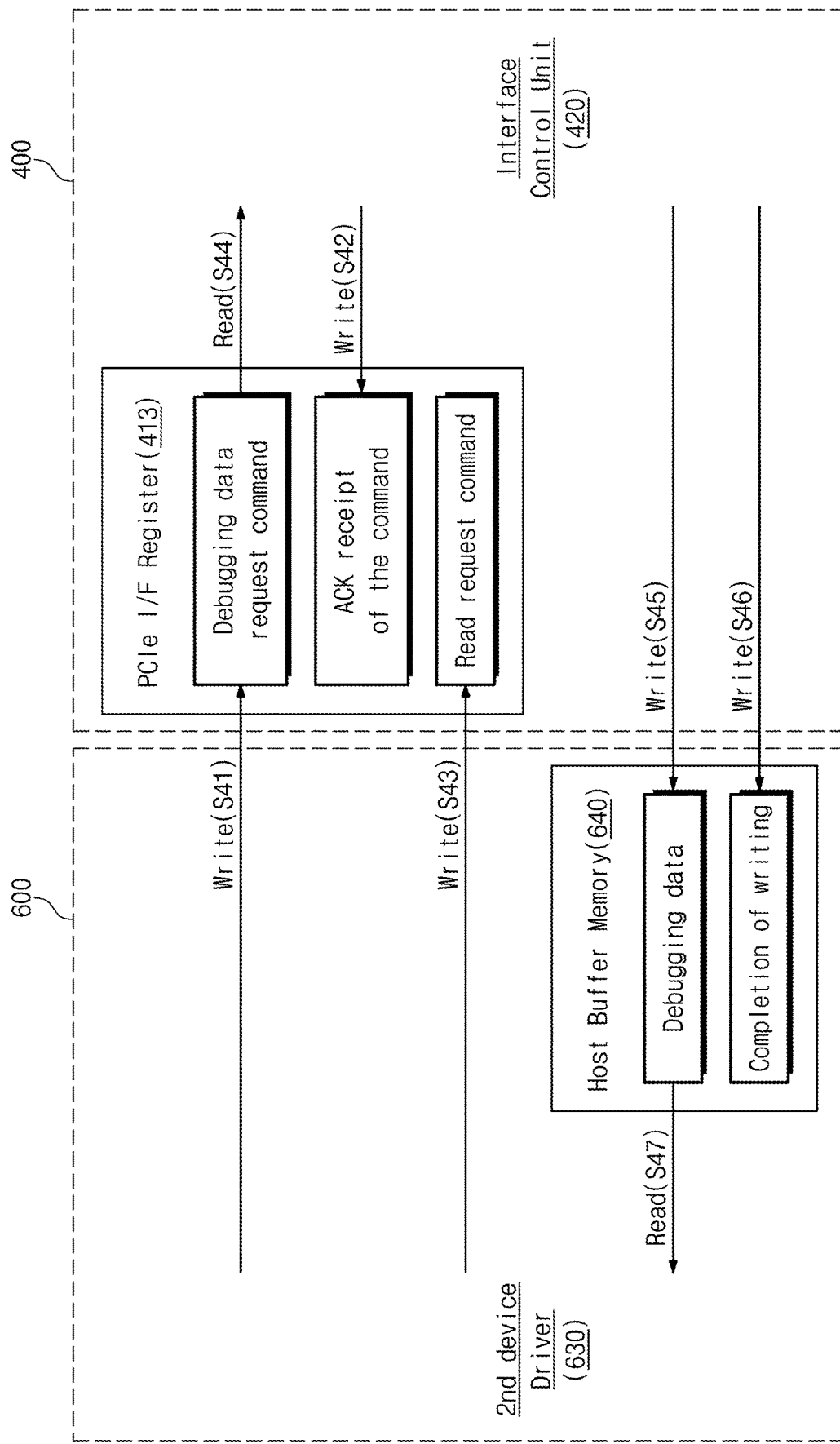
FIG. 9 is a view for describing an example of a protocol used in a debugging operation of the host system of FIG. 7.

FIG. 9 is a view for describing an example of a protocol used in a debugging operation of a host system of FIG. 7. Referring to FIGS. 7 and 9, the host system 20 may transmit and receive the command CMD and the data DATA by using the register 413 and the host buffer memory 640.

The host 600 may collect debugging data through the second device driver 630. The storage device controller 400 may provide the debugging data through the interface controller 420.

Below, for convenience of description, the protocol used in the debugging operation will be described with reference to the second device driver 630 and the interface controller 420 included in the host system 20.

In the case where the debugging operation is requested from the host 600, the second device driver 630 may generate the debugging data request command CMD. The generated debugging data request command CMD may be a command CMD for receiving the debugging data through the host buffer memory 640. For example, the debugging data request command CMD may include memory address information. The memory address information may indicate an address of the host buffer memory 640 at which the debugging data will be stored.

After the command CMD is generated, the second device driver 630 and the interface controller 420 may perform operation S41 and operation S42. Operation S41 and operation S42 are the same as operation S21 and operation S22 of FIG. 5, and thus, a detailed description thereof will not be repeated here.

In operation S43, the second device driver 630 may store the read request command CMD in the register 413. The read request command CMD may be a command CMD for requiring the interface controller 420 to transmit the debugging data once (e.g., burst read).

In operation S44, the interface controller 420 may fetch and interpret the debugging data request command CMD in response to the read request command CMD. Accordingly, the interface controller 420 may check an address of the host buffer memory 640 at which the debugging data will be stored.

In operation S45, the interface controller 420 may store the debugging data at an allocated address of the host buffer memory 640. The interface controller 420 may directly access the host buffer memory 640 to store the debugging data. In this case, the interface controller 420 may store the debugging data in the host buffer memory 640 once depending on the read request command CMD (e.g., burst write).

After storing the debugging data in the host buffer memory 640, in operation S46, the interface controller 420 may store a value (e.g., a completion message) indicating completion of writing the debugging data in the host buffer memory 640. For example, the interface controller 420 may store a value indicating write completion in a completion queue of the host buffer memory 640.

After checking the completion of writing the debugging data, in operation S47, the second device driver 630 may read the debugging data stored in the host buffer memory 640.

Through operation S41 to operation S47, the host 600 may request the debugging data from the storage device controller 400 by using the register 413, and the storage device controller 400 may transfer the debugging data to the host 600 by using the host buffer memory 640.

Figure 10:
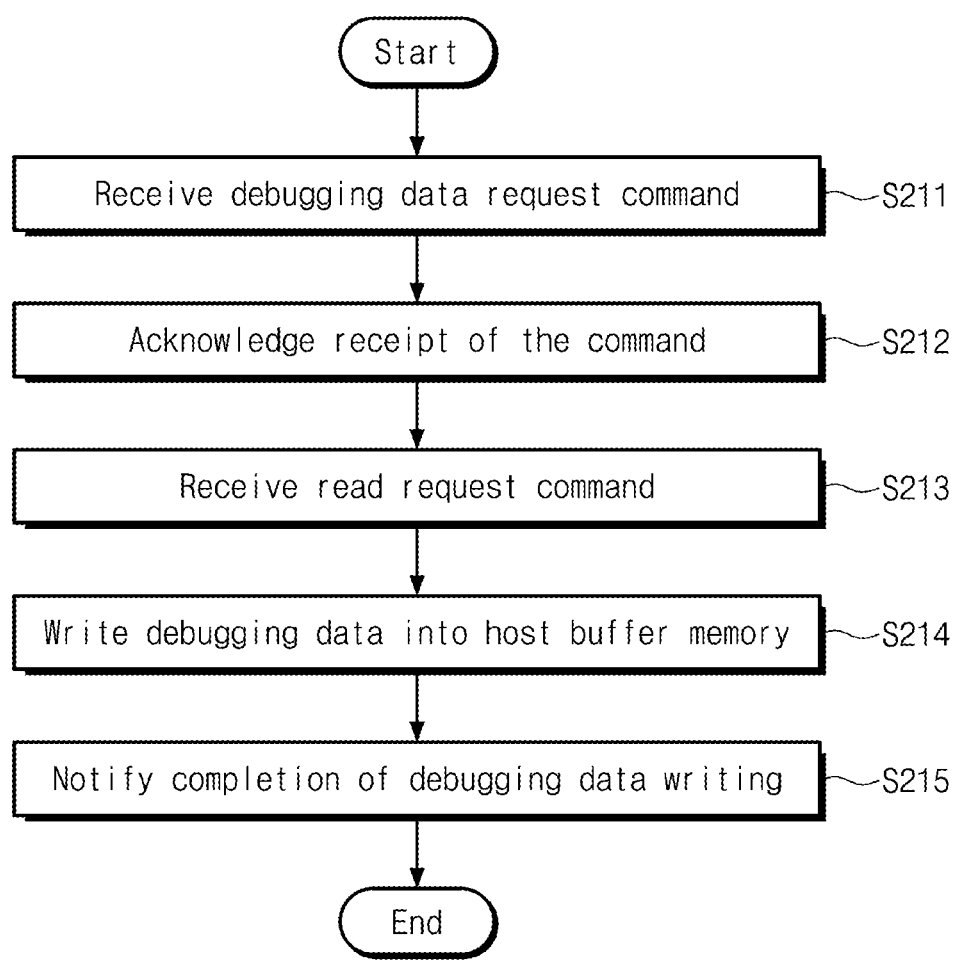
FIG. 10 is a flowchart illustrating an operation method of the storage device controller of FIG. 7 according to an example embodiment.

FIG. 10 is a flowchart illustrating an operation method of a storage device controller of FIG. 7 according to an example embodiment. Referring to FIGS. 7 and 10, the storage device controller 400 may perform operation S211 to operation S213. Operation S211 to operation S213 are the same as operation S111 to operation S113 of FIG. 6, and thus, a detailed description thereof will not be repeated here.

In operation S214, the storage device controller 400 may store debugging data in the host buffer memory 640 in response to a received read request command CMD. In an example embodiment, the debugging data request command CMD received in operation S211 may include an address of the host buffer memory 640. The storage device controller 400 may store the debugging data at an allocated address based on the debugging data request commands CMD.

In operation S215, the storage device controller 400 may notify the host 600 that the debugging data are completely written. In an example embodiment, the storage device controller 400 may store a value indicating write completion in the host buffer memory 640.

As described above, for convenience of description, an example in which a host buffer memory is not used is described with reference to FIG. 3, and an example in which a host buffer memory is used is described with reference to FIG. 7. However, the present disclosure may not be limited thereto. In an example embodiment, a host system may collect the debugging data by using a host buffer memory or may collect the debugging data by using only a register of a PCIe interface.

For example, a storage device controller may store the debugging data in the register of the PCIe interface or the host buffer memory based on the debugging data request command CMD. In the case where the debugging data request command CMD does not include a memory address, the storage device controller may store the debugging data in the register of the PCIe interface. In the case where the debugging data request command CMD includes a memory address, the storage device controller may store the debugging data in the host buffer memory.

Accordingly, the host system according to an example embodiment may collect the debugging data by using one of the register of the PCIe interface or the host buffer memory, depending on a situation. For example, in the case where a direct access of the storage device controller to the host buffer memory is impossible, the host system may collect the debugging data through the register of the PCIe interface.

Figure 11:
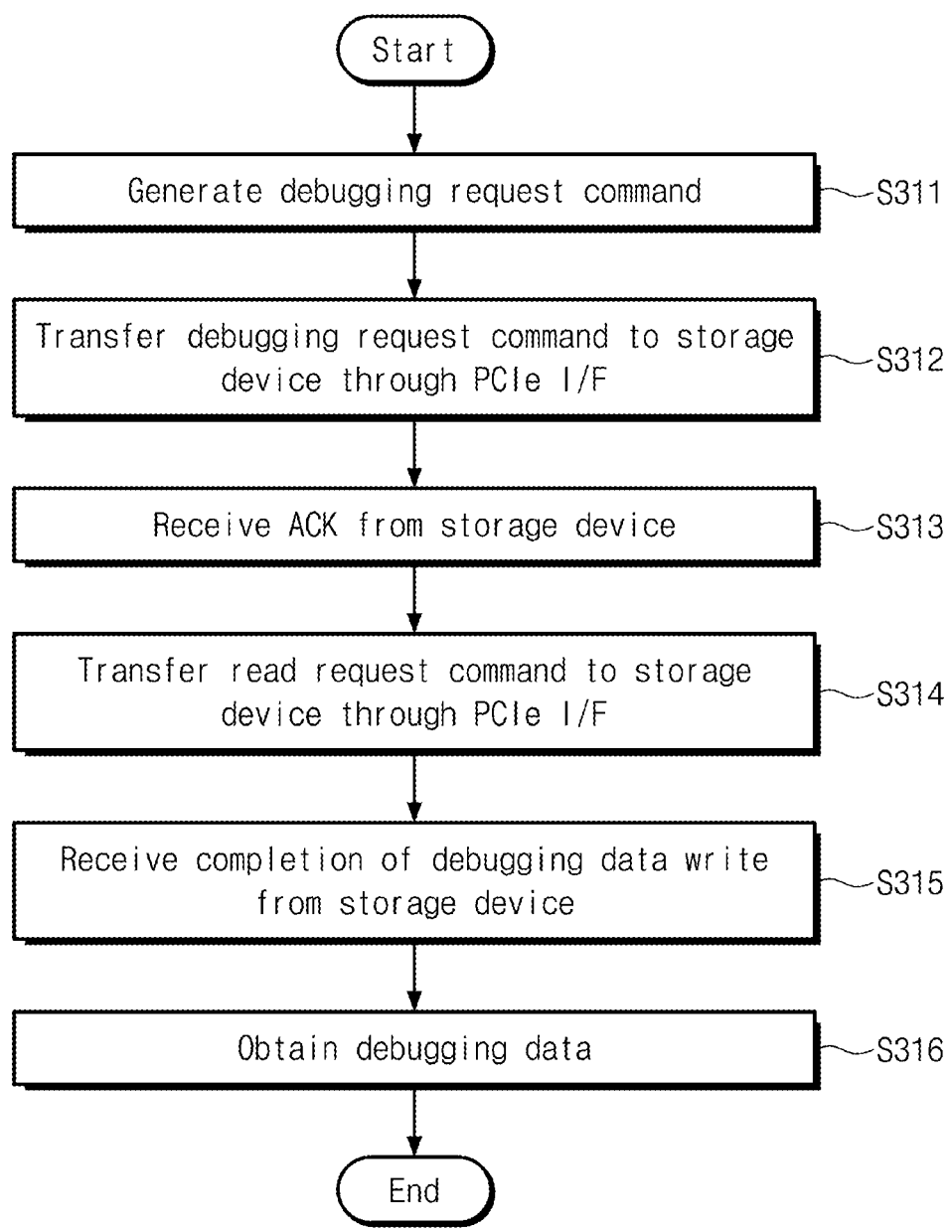
FIG. 11 is a flowchart illustrating an operation of a second device driver according to an example embodiment.

FIG. 11 is a flowchart illustrating an operation of a second device driver according to an example embodiment. Referring to FIG. 11, a second device driver may operate as an application for performing a debugging operation is executed. In operation S311, the second device driver may generate a debugging data request command. The debugging data request command may include a memory address. Alternatively, the debugging data request command may not include a memory address. The command that does not include a memory address may be a command that requires a storage device controller to store debugging data in a register of a PCIe interface. The command that includes a memory address may be a command that requires the storage device controller to store the debugging data in a host buffer memory.

In operation S312, the second device driver may transfer the generated debugging data request command to a storage device through a PCIe interface. In an example embodiment, the second device driver may store the debugging data request command to a register included in the PCIe interface.

In operation S313, the second device driver may receive a command receipt confirm response ACK from the storage device. In operation S314, the second device driver may transfer a read request command to the storage device through the PCIe interface. In an example embodiment, the second device driver may store the read request command in the register included in the PCIe interface.

In operation S315, the second device driver may receive a message indicating that the debugging data is completely written, from the storage device. In operation S316, the second device driver may obtain the debugging data. In an example embodiment, the second device driver may fetch the debugging data from the register of the PCIe interface. Alternatively, the second device driver may fetch the debugging data from the host buffer memory.

The second device driver may transfer the obtained debugging data to the application. The application may check the failure cause of the storage device from the obtained debugging data.

Figure 12:
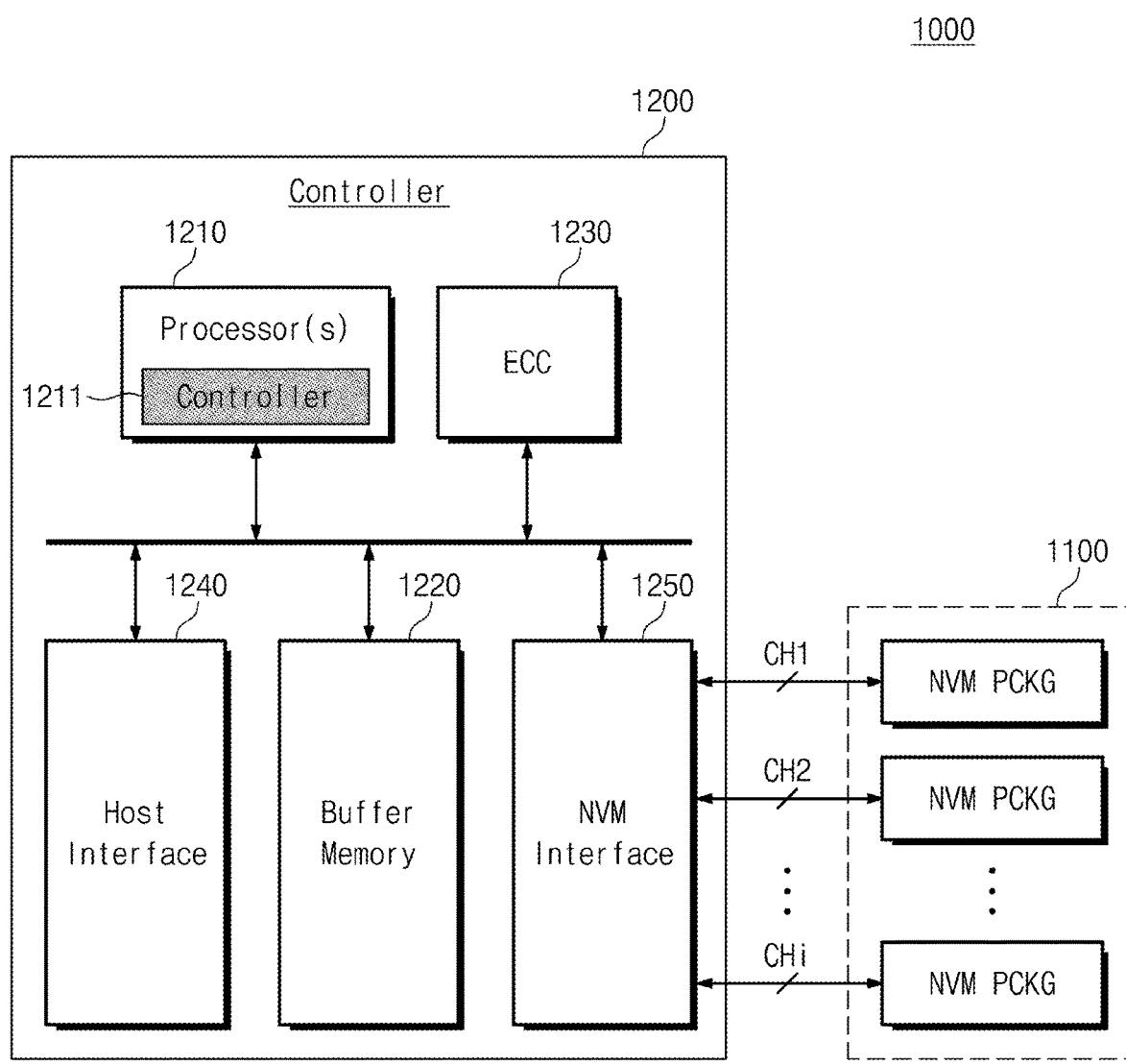
FIG. 12 is a block diagram illustrating a solid state drive according to an example embodiment.

FIG. 12 is a block diagram illustrating a solid-state drive (SSD) according to an example embodiment. Referring to FIG. 12, an SSD 1000 may include a plurality of nonvolatile memory packages 1100 and a controller 1200. For example, the SSD 1000 may be an NVMe SSD.

Each of the nonvolatile memory packages 1100 may include a plurality of nonvolatile memory devices. A nonvolatile memory device may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), or the like.

The controller 1200 may include a processor 1210, a buffer memory 1220, an error correction circuit 1230, a host interface 1240, and a nonvolatile memory interface 1250. In an example embodiment, the controller 1200 may include a storage device controller described with reference to FIGS. 1 to 11. The controller 1200 may be connected to the nonvolatile memory packages 1100 through a plurality of channels CH1 to CHi.

The processor 1210 may control respective components included in the controller 1200 and may perform an arithmetic operation necessary for an operation of the controller 1200. The processor 1210 may include a controller 1211. The controller 1211 may manage data input/output of the nonvolatile memory packages 1100 and may manage data input/output of each component included in the controller 1200. The controller 1211 may perform operations of an interface controller according to an example embodiment.

The buffer memory 1220 may temporarily store data necessary for an operation of the controller 1200. For example, the controller 1200 may collect debugging data and may store the collected debugging data in buffer memory 1220. If a request associated with the debugging data is received from a host, the controller 1200 may transmit the debugging data stored in the buffer memory 1220 to the host.

The error correction circuit 1230 may calculate a value of an error correction code of data to be programmed in a write operation and may correct data read in a read operation based on the value of the error correction code.

The host interface 1240 may provide an interface function for communicating with the host. The host interface 1240 may be implemented with various interfaces and may be implemented with a plurality of interfaces. For example, the host interface 1240 may include a PCIe interface and an NVMe interface according to an example embodiment. Accordingly, the controller 1200 may receive a debugging data request command from the host through a register included in the host interface 1240 and may transmit the debugging data. Alternatively, the controller 1200 may directly transmit the debugging data to the host depending on the debugging data request command.

The nonvolatile memory interface 1250 may provide an interface function for communicating with the nonvolatile memory packages 1100. The controller 1200 may receive data from the nonvolatile memory packages 1100 through the nonvolatile memory interface 1250. For example, the controller 1200 may receive dump data or log data associated with the nonvolatile memory packages 1100 through the nonvolatile memory interface 1250.

Figure 13:
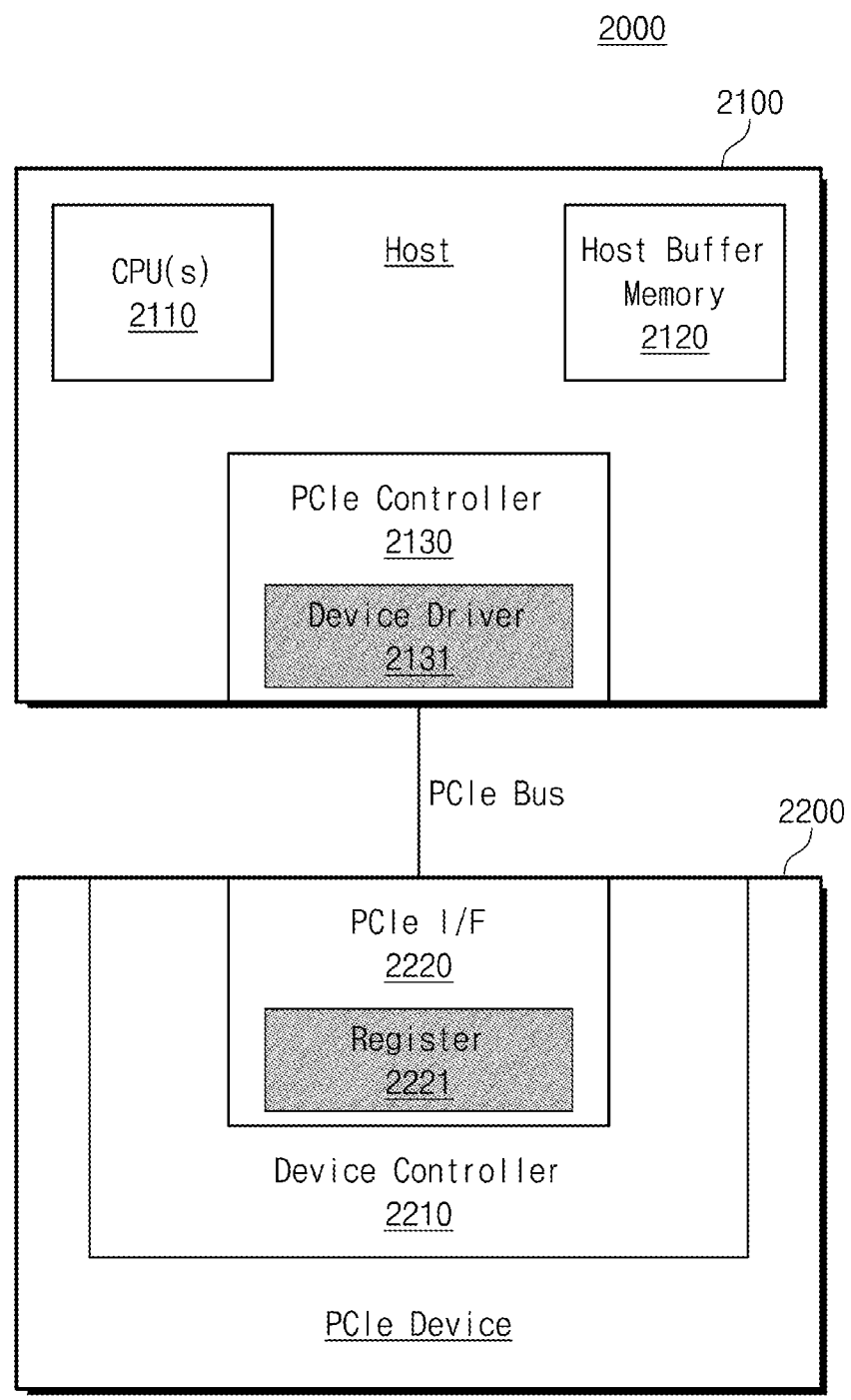
FIG. 13 is a block diagram illustrating the host system according to an example embodiment.

FIG. 13 is a block diagram illustrating a host system according to an example embodiment. Referring to FIG. 13, a host system 2000 may include a host 2100 and a PCIe device 2200. The host 2100 and the PCIe device 2200 may be connected through a PCIe bus and may communicate with each other based on a PCIe interface.

The host 2100 may include at least one central processing unit (CPU) 2110, a host buffer memory 2120, and a PCIe controller 2130. The central processing unit 2110 may perform a control function, an arithmetic operation, and the like necessary for an operation of the host 2100. The host buffer memory 2120 may be a memory area that the PCIe device 2200 is able to independently use. In an example embodiment, an operating system included in the host 2100 may allocate a memory area, which the PCIe device 2200 will use, from among areas of the host buffer memory 2120. The PCIe device 2200 may directly access the host buffer memory 2120 to fetch or store data.

The PCIe controller 2130 may transmit a command of the host 2100 to the PCIe device 2200 or may transmit data received from the PCIe device 2200 to the host 2100. The PCIe controller 2130 may control an operation of the PCIe device 2200 by transmitting a command to the PCIe device 2200. In an example embodiment, the PCIe controller 2130 may include at least one device driver 2131 for controlling the PCIe device 2200. The device driver 2131 may generate a command to be transmitted to the PCIe device 2200 based on a given protocol. For example, the device driver 2131 may include the second device driver according to an example embodiment. The second device driver may generate a command for a debugging operation of the PCIe device 2200 and may transmit the generated command to the PCIe device 2200 through a PCIe bus.

The PCIe device 2200 may include a device controller 2210. The device controller 2210 may control an operation of the PCIe device 2200. For example, the PCIe device 2200 may include an NVMe device, a graphics processing unit (GPU), a network interface card (NIC), and the like. The device controller 2210 may control an operation of the PCIe device 2200 based on a kind of the PCIe device 2200.

The device controller 2210 may communicate with the host 2100 through a PCIe interface 2220. The PCIe interface 2220 may include a register 2221. The device controller 2210 and the host 2100 may communicate with each other by using the register 2221. In an example embodiment, the host 2100 may use the register 2221 for the purpose of performing a debugging operation on the PCIe device 2200. For example, the device driver 2131 may store a debugging data request command in the register 2221. The device controller 2210 may store debugging data in the register 2221 in response to the command. In this case, the host 2100 may receive the debugging data from the PCIe device 2200.

Alternatively, the device controller 2210 and the host 2100 may communicate with each other by using the register 2221 and the host buffer memory 2120. In an example embodiment, the host 2100 may use the register 2221 and the host buffer memory 2120 for the purpose of performing a debugging operation on the PCIe device 2200. For example, the device driver 2131 may store the debugging data request command in the register 2221. The device controller 2210 may store the debugging data in the host buffer memory 2120 in response to the command. As such, the host 2100 may receive the debugging data from the PCIe device 2200.

As described above, according to an example embodiment, the host 2100 may perform the debugging operation on the PCIe interface 2200. The present disclosure allows debugging data to be collected by using the PCIe interface 2220 or the host buffer memory 2120 without the need of extra hardware.

According to an example embodiment, a storage device controller may transmit debugging data to a host by using only a PCIe interface. Accordingly, the storage device controller may transmit the debugging data at fast speed and may not need separate equipment in transmitting the debugging data.

While the example embodiments have been described, it will be apparent to those of ordinary skill in the art that various changes and modifications may be made thereto without departing from the spirit and scope of the present disclosure as set forth in the following claims.

What is claimed is:

1. A method of operating a storage device controller which controls a storage device, the method comprising:
   communicating, with a host device accessing the storage device, over a peripheral component interconnect express (PCIe) interface between the storage device and the host device using a nonvolatile memory express (NVMe) protocol;
   receiving a debugging data request command through the PCIe interface from the host device based on a failure of the communicating using the NVMe protocol between the storage device and the host device, wherein the debugging data request is based on a PCIe protocol; and
   transmitting, to the host device through the PCIe interface using the PCIe protocol, debugging data for debugging the failure of the communicating between the storage device and the host device using the NVMe protocol, in response to receiving the debugging data request command.

2. The method of claim 1, further comprising:
   storing the debugging data in a register of the PCIe interface,
   wherein the register is included in a PCIe extended configuration register space of the PCIe interface.

3. The method of claim 2, wherein the debugging data include at least one of dump data and log data.

4. The method of claim 2, wherein the debugging data request command is stored in the register.

5. The method of claim 2, further comprising:
acknowledging receipt of the debugging data request command; and
receiving a read request command from the host device, wherein the debugging data is stored in the register in response to receiving the read request command.

6. The method of claim 5, wherein the read request command is stored in the register.

7. The method of claim 5, further comprising:
storing information indicating that the debugging data is completely written in the register after the storing the debugging data.

8. The method of claim 1, further comprising:
storing the debugging data in a host buffer memory included in the host device.

9. The method of claim 8, wherein the debugging data request command is stored in a register included in the PCIe interface.

10. The method of claim 8, wherein the debugging data request command includes address information of the host buffer memory.

11. The method of claim 10, wherein the debugging data are stored in an area corresponding to the address information among areas of the host buffer memory.

12. The method of claim 8, further comprising:
acknowledging receipt of the debugging data request command to the host device; and
receiving a read request command from the host device, wherein the debugging data is stored in response to receiving the read request command.

13. The method of claim 12, wherein the read request command is stored in a register included in the PCIe interface.

14. The method of claim 12, wherein the read request command requests burst read associated with the debugging data.

15. The method of claim 14, wherein the debugging data is burst written in the host buffer memory.

16. The method of claim 12, further comprising:
storing information indicating that the debugging data is completely written in the host buffer memory after storing the debugging data.

17. A method of operating a host system comprising a host device and a storage device, the method comprising:
communicating between the host device and the storage device to access the storage device over a peripheral component interconnect express (PCIe) interface between the storage device and the host device using a nonvolatile memory express (NVMe) protocol;
detecting a failure of the communicating between the storage device and the host device over the PCIe interface using the NVMe protocol;
transmitting, from the host device, a debugging data request command to the storage device over the PCIe interface using a PCIe protocol, in response to detecting the failure of the communicating between the storage device and the host device using the NVMe protocol;
transmitting, from the storage device, debugging data to the host device through the PCIe interface using the PCIe protocol; and
debugging, by the host device, the failure of the communicating between the storage device and the host device using the NVMe protocol, in response to receiving the debugging data.

18. The method of claim 17, wherein the host device and the storage device comprise a first device driver that operates based on the NVMe protocol, and a second device driver that operates based on the PCIe protocol.

19. The method of claim 17, wherein the transmitting the debugging data to the host device comprises:
storing, at the storage device, the debugging data in a register included in the PCIe interface.

20. The method of claim 17, wherein the transmitting the debugging data to the host device comprises:
storing, at the storage device, the debugging data in a host buffer memory included in the host device.

* * * * *